UNITED STATES PATENT OFFICE.

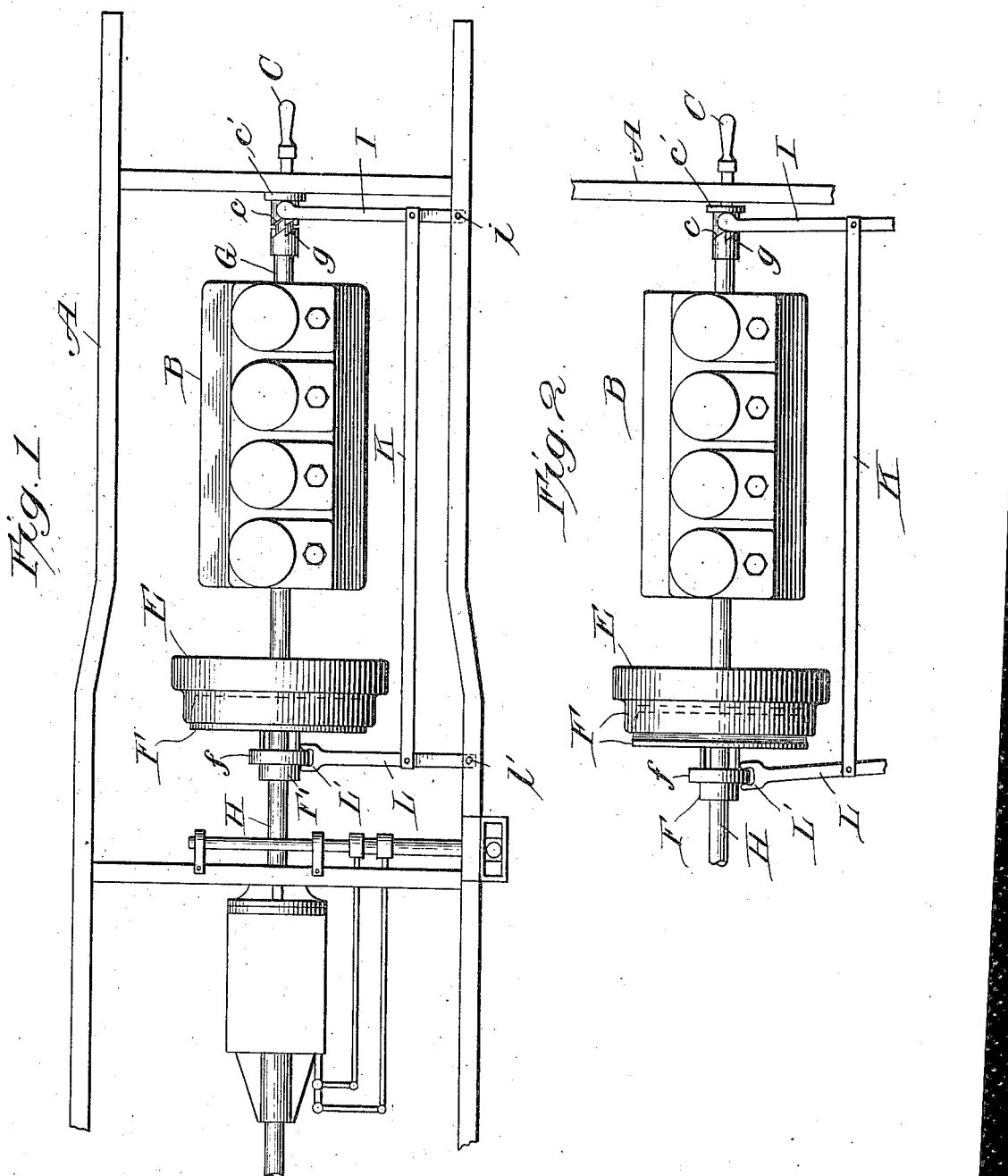

THOMAS B. JEFFERY, OF KENOSHA, WISCONSIN; KATE E. JEFFERY, CHARLES T. JEFFERY, AND HAROLD W. JEFFERY EXECUTORS OF SAID THOMAS B. JEFFERY, DECEASED.

SAFETY ATTACHMENT FOR AUTOMOBILES.

964,427.

Specification of Letters Patent. Patented July 12, 1910.

Application filed December 30, 1909. Serial No. 535,606.

*To all whom it may concern:*

Be it known that I, THOMAS B. JEFFERY, a citizen of the United States, residing at Kenosha, county of Kenosha, State of Wisconsin, have invented a certain new and useful Improvement in Safety Attachments for Automobiles, and declare the following to be a full, clear, and exact description of the same, such as will enable others skilled in the art to which it pertains to make and use the same, reference being had to the accompanying drawings, which form a part of this specification.

My invention has for its object to provide a safety device for making it impossible to set an automobile engine in rotation by means of the usual starting crank unless the engine is unclutched from the transmission shaft or other driving member connected with the propelling wheels.

The various features of novelty whereby my invention is characterized will hereinafter be pointed out with particularity in the claims; but for a full understanding of my invention and of its object and advantages reference may be had to the following detailed description taken in connection with the accompanying drawing, wherein:

Figure 1 is a plan view of the front portion of the frame of an automobile showing the engine, clutch, starting crank, and my improved safety device; and Fig. 2 is a view similar to Fig. 1, less of the mechanism being shown, however, and the parts being in different positions than in Fig. 1.

Referring to the drawing, A represents the frame of an automobile, B the engine, C the starting crank, E the usual fly wheel, and F a movable clutch member which coöperates with a portion of the fly wheel to clutch the engine shaft G to the transmission shaft H. F' is an actuating member for the movable clutch member. All of these parts may, of course, take any usual or preferred forms, those shown being simply examples of the general types. In the arrangement shown the crank is of the type which has a series of ratchet teeth, as indicated at $c$, which are adapted to mesh with similar teeth on the engine shaft, as indicated at $g$. Normally the crank lies in its idle position with the teeth out of mesh, and when it is desired to crank the engine the crank is forced inwardly so as to bring the teeth into interlocking engagement with each other.

In accordance with my invention I provide a locking device which will prevent the crank from being brought into operative relation to the engine shaft unless the clutch has been thrown out, thereby preventing accidents due to starting of the automobile at the time of cranking. This locking device may, of course, take various forms consisting essentially, however, only of a movable abutment for the crank which is in turn controlled by some part associated with the movable member of the clutch. In the arrangement shown there is provided a lever I which is hinged at one end, as at $i$, to some stationary part and extends behind a collar $c^1$ on the crank.

To the lever is connected an elongated strut K which projects rearwardly and is connected at its rear end to a lever L pivoted at one end to the frame as at $l'$. The free end of the lever L extends into proximity to the member F' and is there provided with a fork L' which receives an annular shoulder $f$ on the member F'. When the clutch is in, as shown in Fig. 1, the shoulder $f$ carries the free end of the lever L forwardly and through the strut holds the lever I in a position wherein it prevents the crank from moving inwardly far enough to interlock the teeth.

When the movable member of the clutch is disengaged from the coöperating member so as to disconnect the engine from the transmission shaft, as shown in Fig. 2, the lever L is carried rearwardly a sufficient distance to permit the crank to be brought into operative relation with the engine shaft. It will thus be seen that I have provided a simple and effective expedient for guarding against accidents due to starting of automobiles at the time of cranking the engines thereof.

While I have described in detail only a single embodiment of my invention, I do not desire to be limited to the structural details described, but intend to cover all forms and arrangements which fall within the terms employed in the definitions of my invention constituting the appended claims.

What I claim is:

1. In an automobile having an engine, a transmission shaft, a clutch between the engine and the transmission shaft, a starting crank for the engine movable between an operative position and an idle position, and means associated with said clutch for locking said crank in the idle position when the two members of the clutch are engaged with each other.

2. In an automobile having an engine, a transmission shaft, a clutch between the engine and the transmission shaft, a starting crank for the engine movable between an operative position and an idle position, a movable abutment for locking the starting crank in the idle position and a shoulder associated with the movable member of the clutch for locking said abutment against displacement when the clutch members are in engagement with each other.

3. In an automobile having an engine, a transmission shaft, a clutch between the engine and the said shaft, a starting crank for the engine movable between an operative position and an idle position, and means associated with one member of the clutch for preventing the starting crank from assuming its operative position when said member of the clutch is in engagement with its coöperating member.

In testimony whereof, I sign this specification in the presence of two witnesses.

THOMAS B. JEFFERY.

Witnesses:
WM. F. FREUDENREICH,
RUBY V. BRYDGES.